United States Patent [19]
Niewold et al.

[11] Patent Number: 5,113,952
[45] Date of Patent: May 19, 1992

[54] AUGER PLANTER METHOD

[75] Inventors: D. Wayne Niewold, Loda; Richard A. Bradley, Urbana, both of Ill.

[73] Assignee: Power Planter, Inc., Paxton, Ill.

[21] Appl. No.: 760,883

[22] Filed: Sep. 16, 1991

Related U.S. Application Data

[60] Division of Ser. No. 388,744, Aug. 1, 1989, Pat. No. 5,067,571, which is a continuation of Ser. No. 178,531, Apr. 7, 1988, abandoned.

[51] Int. Cl.$^5$ .............................................. E21B 10/44
[52] U.S. Cl. ...................................... 175/57; 175/394; 175/385
[58] Field of Search ................. 175/57, 323, 394, 395, 175/403, 385

[56] References Cited

U.S. PATENT DOCUMENTS

| | | | |
|---|---|---|---|
| 3,226,855 | 1/1966 | Smith | 175/394 X |
| 3,356,168 | 12/1967 | Johnson | 175/394 |
| 3,444,940 | 5/1969 | Thomas et al. | 175/394 |
| 4,185,707 | 1/1980 | Wilson | 175/394 |
| 4,282,943 | 8/1981 | Leitner | 175/394 |
| 4,653,245 | 3/1987 | Webb | 175/394 |
| 4,742,656 | 5/1988 | Farmer | 175/394 |
| 4,807,710 | 2/1989 | Greeley | 175/394 |

Primary Examiner—Stephen J. Novosad
Attorney, Agent, or Firm—Lockwood, Alex, FitzGibbon & Cummings

[57] ABSTRACT

An auger planter is provided for forming small holes in the earth for the planting of flower bulbs and the like. The auger includes a central shaft and a single flighting having its leading and trailing ends truncated. When used, the single flighted auger exhibits minimal eccentric orbital rotation and minimizes inadvertent injury to the user.

21 Claims, 1 Drawing Sheet

U.S. Patent May 19, 1992 5,113,952
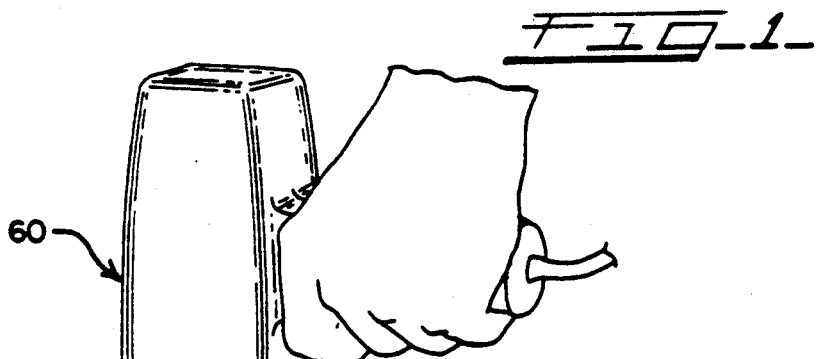
FIG_1_
FIG_2_
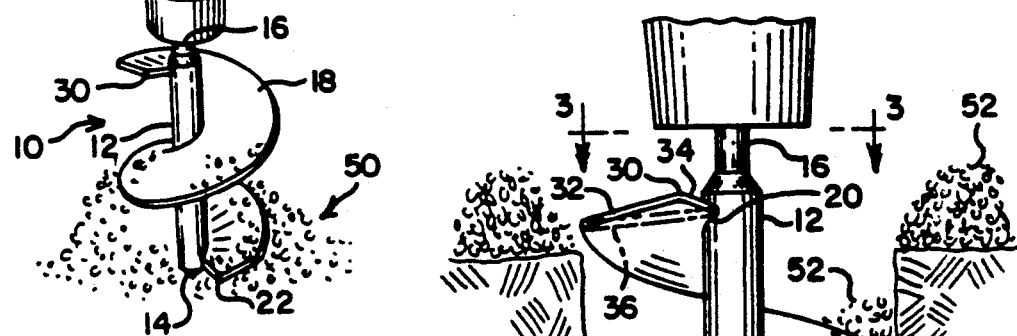
FIG_3_
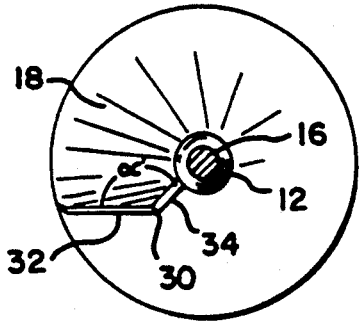
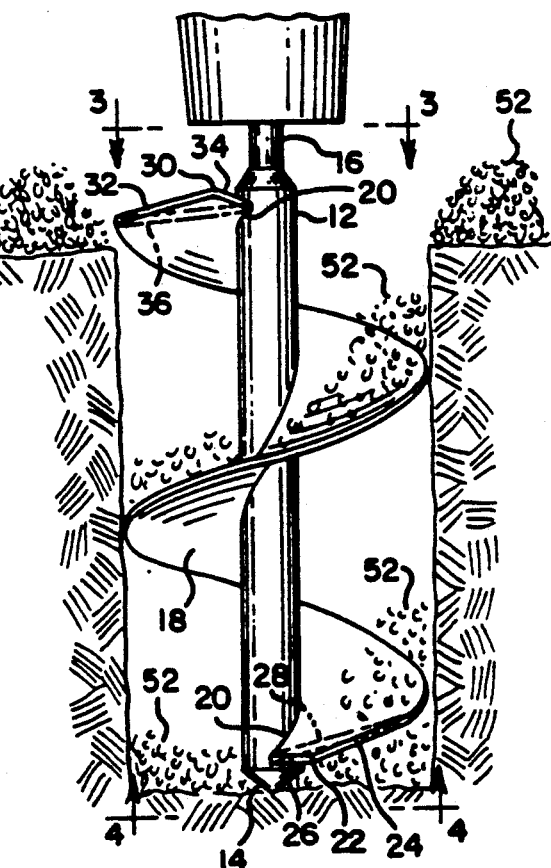
FIG_4_
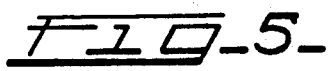
FIG_5_
FIG_6_
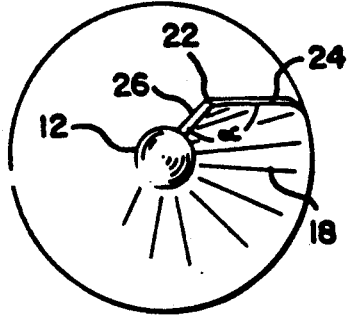
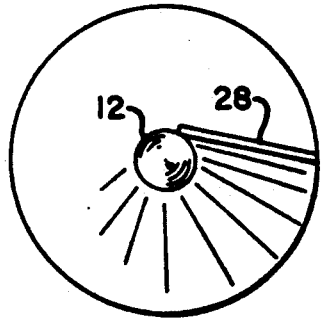
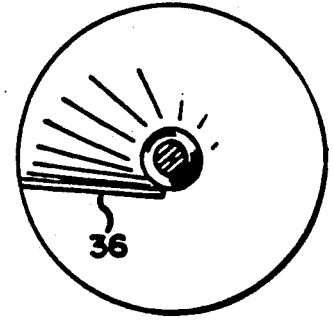

AUGER PLANTER METHOD

This application is a divisional of copending application Ser. No. 388,744, filed Aug. 1, 1989, now U.S. Pat. No. 5,067,571, which was a continuation of Ser. No. 178,531, filed Apr. 7, 1988, now abandoned.

BACKGROUND AND SUMMARY OF THE INVENTION

The present invention generally relates to an improved auger planter and, more particularly, to a single flighted auger planter. The invention is particularly suitable for use in planting flower bulbs and plant seedlings, although it is also useful for virtually any type of application for boring small, shallow holes in the earth.

In any number of gardening applications, there is a need for a device for forming small shallow holes in the ground. For instance, a landscaper or home gardener often forms small, shallow holes in the earth for bulb and seedling planting. Depending upon the ground condition, the number of holes to be dug, and the device used to form such holes, the job can be laborious and time consuming.

Hand operated cylindrical soil cutters have been employed in the past to remove plugs of earth to form small, shallow holes for bulbs and the like. In addition to requiring exhausting manual labor in the use of such cylindrical cutters, one disadvantage in such cutters is that the plug of earth which is removed must subsequently be broken apart to refill the hole after placement of the bulb.

Scoop shaped garden trowels have also been utilized in the past for setting bulbs and the like. Although such trowels provide a means for removing earth in a looser fashion than the cylindrical plug removers, they also require extensive manual labor. Furthermore, it is often desirable to provide a series of uniform holes in the soil, but this is time consuming and/or difficult to achieve with hand held garden trowels.

Earth boring augers have also been utilized in the past to more rapidly bore uniform holes in the earth. Such augers have typically been double flighted, so that the auger does not vibrate or move in an orbital motion as it enters the ground. Such double flighted earth boring augers suffer several disadvantages. One disadvantage is that when holes are formed for the purpose of setting bulbs and the like, it is advantageous to mound the removed soil close to the hole so it will be convenient to refill the hole after the planting step. Double flighted augers, however, tend to throw the dirt too far from the hole to conveniently replace the earth after planting the bulb. Another disadvantage is that double flighted augers tend to plug faster than single flighted augers due to the smaller distance between the flights. Furthermore, double flighted augers tend to be more complex and expensive to produce than single flighted augers.

Single flighted earth boring augers also have been employed in the past for planting. However, they also have suffered certain disadvantages. The prior single flighted augers tend to be rotationally imbalanced compared to the double flighted augers and therefore vibrate or move in an orbital motion. Prior attempts to cure such rotational imbalance have included the approach disclosed in U.S. Pat. No. 3,356,168. In that patent a single flighted auger is disclosed in which the flighting is secured to the shaft by spot welding spaced along and balanced around the shaft in an attempt to minimize rotational imbalance. This approach results in more complex manufacturing procedures and increases the expense of such augers. Even if the potential rotational imbalance problem is overcome, prior single flighted augers have also posed a safety problem to the user due to sharp edged terminal ends of the flighting which can catch the clothing of the user or cut the user's body.

An auger planter incorporating the principles of the present invention overcomes most if not all of the aforementioned disadvantages. An auger planter incorporating the principles of the present invention is easy and safe to use, requires minimal manual labor, is relatively easy and inexpensive to manufacture, removes the soil from the hole in a loose fashion, and mounds the loose soil in close proximity to the hole.

The present invention achieves all of these advantages utilizing an improved single flighted auger having a central shaft which may be powered by a hand drill. The central shaft supports a single flighting having its leading tip, and preferably also its terminal tip, removed or cut back to allow the auger to enter the soil with a minimum imbalance and undesirable vibration and eccentric orbital motion. The truncated or cut back ends of the flighting are preferably blunt thereby minimizing the danger of cutting the body of a person using the auger or of having clothing caught by the flighting ends.

These and other features and advantages of the present invention will be apparent upon considering the following detailed description.

BRIEF DESCRIPTION OF THE DRAWING

In the course of this description, reference will frequently be made to the attached drawing in which:

FIG. 1 is a perspective view of one preferred embodiment of an auger planter incorporating the principles of the present invention and illustrating the auger in use with a hand held power drill;

FIG. 2 is a side elevational view of the auger planter substantially as shown in FIG. 1 and illustrating the manner in which soil is removed to form a planting hole;

FIG. 3 is a cross sectioned top plan view, as viewed substantially along line 3—3 of FIG. 2, and showing the upper trailing edge construction of the auger;

FIG. 4 is a cross sectioned bottom plan view, as viewed substantially along line 4—4 of FIG. 2, and showing the bottom leading edge construction of the auger;

FIG. 5 is a cross sectioned bottom plan view showing a second embodiment of the bottom leading edge construction of an auger planter incorporating the principles of the invention; and FIG. 6 is a cross sectioned top plan view showing a second embodiment of the upper trailing leading edge construction of an auger planter incorporating the principles of the invention.

DETAILED DESCRIPTION OF THE PREFERRED EMBODIMENTS

A preferred embodiment of auger planter incorporating the principles of the present invention is generally illustrated at 10 in FIGS. 1-3. The auger planter comprises an auger 10 which includes a central shaft 12 having a bottom leading end 14 and a trailing terminal end 16 Leading end 14 preferably is tapered to facilitate initial placement of the auger against the soil 50, as well as to facilitate and help stabilize the progression of the auger into the ground. In this regard, the taper of leading edge 14 is preferably approximately 30°.

The trailing terminal end 16 of the shaft is adapted to be mounted in the collet of a hand held drill 60. The outer diameter of central shaft 12 and the outer diameter of trailing terminal end 16 can be the same or different. In this regard, it is preferred that auger 10 will be used in association with a standard ¼ or ⅜ inch home hand drill. Accordingly, terminal end 16 of the shaft is preferably dimensioned so as to be adaptable for use in the collet of such drills. Central shaft 12, however, preferably has an outer diameter somewhat greater than ⅜ inches to provide added stability and strength to auger 10. It has been found that a ⅝ inch outer diameter for central shaft 12 provides sufficient strength and stability to auger 10 and does not interfere with the progression of auger 10 into soil 50.

The auger 10 includes flighting 18 which is of a helical or spiral configuration and which is secured along its inner edge 20 to central shaft 12 by suitable means such as spot welding or molding integrally with the shaft. Flighting 18 preferably is right handed to compliment common right handed power drills. It will be appreciated that the width and pitch between flights, of flighting 18 can vary without departing from the principles of the invention. It will further be appreciated that the number of revolutions of flighting 10 can also vary. It has been found that for home gardening use a flighting having a three (3) inch outer diameter, a three (3) inch pitch between flights, and approximately two full revolutions is sufficient to form holes for typical bulb setting and can easily be handled by the horsepower of typical hand held home power drills.

Central shaft 12 and flighting 18 may be formed of the same or different materials. The material used for the central shaft 12 and flighting 18 should be rigid and durable. Typically, central shaft, 12 and flighting 18 will be formed of a suitable metal, but may be formed of rigid plastics or resins. Furthermore, central shaft 12 and flighting 18 may be constructed of separate parts or integrally molded in a manner known to those skilled in the art.

In a first preferred embodiment the lead portion of flighting 18 is truncated or removed to provide a leading edge 22 proximate to the lead end 14. As best seen in FIG. 4, the leading edge 22 comprises a chord portion 24 extending chordally substantially across the flighting 18 on one side of the shaft to a point of intersection with the outer edge of flighting 18. Leading edge 22 also has a radial portion 26 extending outwardly from central shaft 12 to a point of intersection with chord portion 24. Preferably, radial portion 26 and, chord portion 24 intersect at an obtuse angle with portion 24 extending away from the direction of advance of the fighting into the soil. In this regard, the ratio of the length of chord portion 24 to the length of radial portion 26 is preferably about 2:1. With specific reference, for the purpose of illustration only and not limitation, to a flighting having a three inch outer diameter and a ⅝ inch shaft, the 30 length of radial portion 26 would be approximately ½ inch and the length of chord portion 24 would be approximately 1⅛ inch. One or both the chord or radial portions 24 and 26 of the leading edge 22 are preferably blunted to prevent accidental cuts, to prevent leading edge 22 from becoming caught in clothing, and to impede eccentric oscillation of the single flighted auger 10.

The other end of flighting 18 of the first embodiment also terminates in a trailing edge 30. As best seen in FIG. 3, the trailing edge 30, is preferably of similar construction to the leading edge 22 and includes a chord portion, 32 extending chordally substantially across the flighting 18 on one side of the shaft to a point of intersection with the outer edge of flighting 18. Trailing edge 30 also has a radial portion 34 extending outwardly from central shaft 12 to a point of intersection with chord portion 32. The trailing edge chord portion 32 and radial, portion, 34 also preferably intersect at an obtuse angle with portion 32 extending toward the direction of advance of the flighting into the soil. The ratio of the length of chord portion 32 to the length of radial portion 34 may also be about 2:1.

Alternate embodiments of auger leading and trailing edges are shown in FIGS. 5 and 6. In FIG. 5 which illustrates the flighting leading edge of this embodiment, the chord portion 28, shown in phantom in FIG. 2, extends entirely across the flighting 18 on one side of the shaft. In FIG. 6 which illustrates the flighting trailing edge of this embodiment, the chord portion 36, also shown in phantom in FIG. 2, extends entirely across the flighting 18 on one side of the shaft. The trailing edge chord portion 36, as well as leading edge chord portion 28 are preferably blunted in this embodiment so as to prevent accidental injury to the user including accidental cuts and the catching of loose clothing, and the leading edge is also blunted to impede eccentric orbital rotation of auger 10 as it penetrates the soil 50. As shown in FIGS. 2, 5 and 6, the leading edge chord portion 28 and trailing edge chord portion 36 also extend away from and toward, respectively, the direction of advance of the flighting into the soil.

In either the embodiment shown in FIG. 3 or the embodiment shown in FIG. 6, the trailing edge chord portion 32 or chord portion 36, respectively, is preferably angularly disposed to central shaft 12 such that the line of sight along respective chord portion 32 or 36 does not intersect the center of the central shaft 12. Also to minimize undesirable eccentric orbital motion, the chord portion of leading edge 22 and the chord portion of trailing edge 30 are preferably substantially planar to each other in a vertical plane extending substantially parallel to the axis of central shaft 12 as viewed in FIG. 2.

In use, as illustrated in FIGS. 1 and 2, the leading edge 22 of auger 10, enters the soil 50 at an acute angle. As auger 10 is rotated and penetrates the soil 50, loose soil 52 is moved to the surface and accumulates in close proximity to the hole being bored. Additionally, when auger 10 is removed from the hole, some loose soil remains in the bottom of the hole. This remaining loose soil promotes bulb and seedling root growth.

It will be apparent to those skilled in this art that the present invention can be embodied in various forms; accordingly, this invention is to be construed and limited only by the scope of the appended claims.

What is claimed is:

1. A method of substantially reducing rotational imbalance during advance into soil of a power driven auger to remove the soil from the earth to form holes therein, and wherein the auger has a central shaft having a leading end, and said shaft is surrounded by a substantially single flighted helical flighting having a leading edge which is rotated in a given direction to advance the auger into the soil, said method of reducing said rotational imbalance in said substantially single flighted auger comprising forming said leading edge of said flighting into a chord portion extending chordally substantially across said flighting on one side of the shaft and away from said given direction of advance of said flighting into the soil prior to the advance of said flighting into the soil.

2. The method of claim 1, including forming said leading end of said shaft with a taper.

3. The method of claim 2, wherein said taper is approximately 30°.

4. The method of claim 1, including forming the other end of said central shaft with an end portion adapted to be mounted in a hand held drill.

5. The method of claim 4, wherein the outer diameter of said central shaft is greater than the outer diameter of said end portion adapted to be mounted in the drill.

6. The method of claim 1, including forming said leading edge to include a radial portion extending outwardly from said central shaft to a point of intersection with said chord portion.

7. The method of claim 6, including forming said radial portion and said chord portion to intersect each other at an obtuse angle.

8. The method of claim 1, including forming the other end of said helical flighting opposite said leading edge to terminate in a trailing edge, said trailing edge having a chord portion extending chordally substantially across the flighting from adjacent one side of said shaft to a point of intersection with said helically extending edge and toward the direction of advance of the flighting into the soil.

9. The method of claim 8, including forming said trailing edge to further include a radial portion extending outwardly from said central shaft to a point of intersection with said trailing edge chord portion.

10. The method of claim 8, including forming said leading edge chord portion and said trailing edge chord portion to be substantially planar to each other in a plane extending substantially parallel to the axis of said central shaft.

11. The method of claim 1, including forming said chord portion to extend entirely chordally across said flighting on one side of said shaft.

12. The method of claim 8, including forming trailing edge chord portion to extend entirely across said flighting on one side of the shaft.

13. The method of claim 8, including forming said leading edge chord portion to extend entirely chordally across said flighting on one side of said shaft, said trailing edge chord portion to extend entirely chordally across said flighting on one side of said shaft, and said leading edge chord portion and said trailing edge chord portion to be substantially planar to each other in a plane extending substantially parallel to the axis of said central shaft.

14. The method of claim 1, wherein said leading edge is blunt.

15. The method of claim 8, wherein at least one of said leading and trailing edges are blunt.

16. The method of claim 1, including forming said chord portion to be angularly disposed to said central shaft such that the line of sight along said chord portion does not intersect the center of said central shaft.

17. The method of claim 16, including forming the end of said helical flighting opposite said leading edge to terminate in a trailing edge, said trailing edge having a chord portion extending chordally substantially across said flighting on one side of said shaft, said trailing edge chord portion being angularly disposed to said central shaft such that the line of sight along said chord portion does not intersect the center of said central shaft.

18. The method of claim 17, including forming said leading edge chord portion and said trailing edge chord portion to be substantially planar to each other in a plane extending substantially parallel to the axis of said central shaft.

19. The method of claim 17, including forming said leading edge and trailing edge chord portions to extend respectively away from and toward the direction of advance of the flighting into the soil.

20. The method of claim 16, wherein said leading edge of said helical flighting is blunt.

21. The method of claim 18, including forming said leading edge to include a radial portion extending outwardly from said central shaft to a point of intersection with the radially inner portion of said leading edge chord portion, said trailing edge also including a radial portion extending outwardly from said central shaft to a point of intersection with said trailing edge chord portion, said leading edge radial portion and leading edge chord portion intersecting each other at an obtuse angle, and said trailing edge radial portion and said trailing edge chord portion intersecting each other at an obtuse angle.

* * * * *

UNITED STATES PATENT AND TRADEMARK OFFICE
CERTIFICATE OF CORRECTION

PATENT NO. : 5,113,952
DATED : May 19, 1992
INVENTOR(S) : Niewold et al.

It is certified that error appears in the above-indentified patent and that said Letters Patent is hereby corrected as shown below:

```
In col. 2, line 67, after "16" insert a period --.--.
In col. 3, line 38, after "shaft" delete the comma.
In col. 3, line 53, after "and" delete the comma.
In col. 3, line 54, after "angle", insert --α--.
In col. 3, line 56, delete "fighting" and insert --flighting--.
In col. 3, line 61, delete "30".
In col. 4, line 5, delete the comma.
In col. 4, line 11, after "portion", delete the comma.
In col. 4, line 12, after "angle", insert --α'--.
```

Signed and Sealed this

Fourth Day of October, 1994

Attest:

BRUCE LEHMAN

*Attesting Officer*  *Commissioner of Patents and Trademarks*